(12) United States Patent  
Seo et al.

(10) Patent No.: US 12,096,107 B2
(45) Date of Patent: Sep. 17, 2024

(54) SENSOR DRIVING DEVICE AND CAMERA MODULE

(71) Applicant: LG INNOTEK CO., LTD., Seoul (KR)

(72) Inventors: Eun Sung Seo, Seoul (KR); Young Joon Son, Seoul (KR); Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 207 days.

(21) Appl. No.: 17/632,434

(22) PCT Filed: Aug. 21, 2020

(86) PCT No.: PCT/KR2020/011213
§ 371 (c)(1),
(2) Date: Feb. 2, 2022

(87) PCT Pub. No.: WO2021/040341
PCT Pub. Date: Mar. 4, 2021

(65) Prior Publication Data
US 2022/0286591 A1 Sep. 8, 2022

(30) Foreign Application Priority Data

Aug. 29, 2019 (KR) .................. 10-2019-0106928

(51) Int. Cl.
*H04N 23/57* (2023.01)
*H04N 23/54* (2023.01)
*H04N 23/55* (2023.01)
*H04N 23/60* (2023.01)
*H04N 23/68* (2023.01)

(52) U.S. Cl.
CPC ............. *H04N 23/57* (2023.01); *H04N 23/54* (2023.01); *H04N 23/55* (2023.01)

(58) Field of Classification Search
CPC ...... H04N 23/57; H04N 23/54; H04N 23/687; H04N 23/55; H04N 23/60
See application file for complete search history.

(56) References Cited

U.S. PATENT DOCUMENTS 11,740,485 B2 * 8/2023 Park ..................... H04N 23/57
11,968,454 B2 * 4/2024 Oh ........................ H04N 23/687
(Continued)

FOREIGN PATENT DOCUMENTS

CN 104038882 A 9/2014
CN 104218199 A 12/2014
(Continued)

*Primary Examiner* — Marly S Camargo
(74) *Attorney, Agent, or Firm* — Birch, Stewart, Kolasch & Birch, LLP (57) ABSTRACT

A sensor driving device and a camera module are provided. According to an aspect of the present invention, the sensor driving device comprises: a first substrate including a first opening; a housing disposed on the first substrate; a support member disposed at the first opening; an image sensor mounted on the support member; a connector electrically connecting the first substrate and the support member and elastically supporting the support member; a base connected to the support member; a first driver disposed in the housing; and a second driver disposed on the base and facing the first driver.

18 Claims, 6 Drawing Sheets

(56) References Cited

U.S. PATENT DOCUMENTS

| | | | |
|---|---|---|---|
| 2016/0274375 A1* | 9/2016 | Park | ........................ G02B 7/04 |
| 2017/0315377 A1* | 11/2017 | Park | ...................... H04N 23/57 |
| 2018/0188474 A1 | 7/2018 | Enta | |
| 2018/0252893 A1* | 9/2018 | Park | ........................ G02B 7/02 |
| 2019/0011723 A1 | 1/2019 | Park et al. | |
| 2019/0227339 A1 | 7/2019 | Park et al. | |
| 2020/0026026 A1 | 1/2020 | Park et al. | |
| 2021/0006720 A1* | 1/2021 | Enta | ..................... H04N 23/687 |
| 2022/0255414 A1* | 8/2022 | Kim | ....................... H04N 23/57 |
| 2022/0337753 A1* | 10/2022 | Oh | ....................... H04N 23/687 |
| 2023/0359059 A1* | 11/2023 | Park | ...................... H04N 23/57 |
| 2024/0064404 A1* | 2/2024 | Oh | ....................... H04N 23/687 |

FOREIGN PATENT DOCUMENTS

| | | | |
|---|---|---|---|
| CN | 105988177 A | 10/2016 | |
| CN | 105988262 A | 10/2016 | |
| CN | 107710066 A | 2/2018 | |
| CN | 108351484 A | 7/2018 | |
| JP | 2008-113060 A | 5/2008 | |
| JP | 2019-512734 A | 5/2019 | |
| KR | 10-2010-0060554 A | 6/2010 | |
| KR | 10-2016-0009387 A | 1/2016 | |
| KR | 10-2016-0112126 A | 9/2016 | |
| KR | 10-2017-0082805 A | 7/2017 | |
| KR | 10-2018-0114804 A | 10/2018 | |
| WO | WO 2017/043884 A1 | 3/2017 | |

\* cited by examiner

SENSOR DRIVING DEVICE AND CAMERA MODULE

CROSS REFERENCE TO RELATED APPLICATIONS

This application is the National Phase of PCT International Application No. PCT/KR2020/011213, filed on Aug. 21, 2020, which claims priority under 35 U.S.C. § 119(a) to Patent Application No. 10-2019-0106928, filed in the Republic of Korea on Aug. 29, 2019, all of which are hereby expressly incorporated by reference into the present application.

TECHNICAL FIELD

The present invention relates to a sensor driving device and a camera module.

BACKGROUND ART

The content described below provides background information on the present embodiment and does not describe the prior art.

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, an autofocus function for automatically adjusting a focus according to a distance of a subject is applied to a recent camera module. In addition, a hand shake correction function to prevent image shaking phenomenon due to hand shake of a photographer is applied.

Meanwhile, various attempts have been made to reduce the size of a sensor driving device applied to a camera module and reduce power consumption for an autofocus function or an image stabilization function.

DETAILED DESCRIPTION OF THE INVENTION

Technical Subject

An object of the present invention is to provide a sensor driving device and a camera module capable of reducing the size of the sensor driving device and reducing power consumption.

Technical Solution

A sensor driving device according to an aspect of the present invention for achieving the above object comprises: a first substrate comprising a first opening; a housing disposed on the first substrate; a support member disposed at a position corresponding to the first opening; an image sensor mounted on the support member; a connector electrically connecting the first substrate and the support member and elastically supporting the support member; a base connected to the support member; a first driving part disposed in the housing; and a second driving part disposed on the base and facing the first driving part.

In addition, the connector may be bent at least twice.

In addition, the support member comprises first to fourth side surfaces; the first substrate comprises first to fourth inner side surfaces facing the first to fourth side surfaces, respectively; one end of the connector is connected to the first side surface, and the other end may be connected to the fourth inner side surface.

In addition, the connector may comprise: a first region connected to the first side surface; a second region bent vertically from the first region; a third region bent vertically from the second region; and a fourth region bent vertically from the third region and connected to the fourth inner side surface.

In addition, the connector may comprise a plurality of connectors spaced apart from one another.

In addition, the plurality of connectors may comprise: a first connector connected to the first side surface and the fourth inner side surface; a second connector connected to the second side surface and the first inner side surface; a fourth connector connected to the third side surface and the second inner side surface; and a fourth connector connected to the fourth side surface and the first inner side surface.

In addition, the first connector is overlapped with the second connector in a first direction, and may not be overlapped with the third and fourth connectors in the first direction.

In addition, the first connector is overlapped with the fourth connector in a second direction perpendicular to the first direction, and may not be overlapped with the second and third connectors in the second direction.

In addition, the first connector may comprise a plurality of first connectors spaced apart from one another.

In addition, it may comprise a guide member disposed between an upper surface of the base and an inner side surface of the housing.

In addition, the guide member may comprise a guide ball.

In addition, a groove formed in at least one of an upper surface of the base and an inner side surface of the housing is comprised, and at least a portion of the guide member may be seated in the groove.

In addition, the support member is formed of a second substrate, and the second substrate may be electrically connected to the first substrate by the connector.

In addition, the second substrate may be electrically connected to the second driving part through the base.

In addition, it comprises a third substrate being fixed to the housing, and the third substrate may be electrically connected to the first driving part.

In addition, the base comprises a second opening being overlapped with the image sensor in an optical axis direction, the housing comprises a third opening being overlapped with the second opening in the optical axis direction, and the third substrate may comprise a fourth opening being overlapped with the third opening in the optical axis direction.

In addition, a lower surface of the support member is disposed below a lower surface of the first substrate, and the connector may be connected to a lower surface of the support member and a lower surface of the first substrate.

A camera module according to an aspect of the present invention for achieving the above object comprises: a housing; a first substrate comprising a first opening and disposed to be coupled to the housing; a support member disposed in the first opening; an image sensor mounted on the support member; a connector electrically connecting the first substrate and the support member, and elastically supporting the support member; a base connected to the support member; a first driving part disposed in the housing; a second driving part disposed on the base and facing the first driving part;

and a lens module disposed in the housing and overlapping the image sensor in an optical axis direction.

In addition, a third substrate disposed on the housing and electrically connected to the first driving part and the lens module is comprised, and the lens module may comprise a liquid lens unit.

In addition, the connector may be bent at least twice.

Advantageous Effects

Through the present embodiment, it is possible to provide a sensor driving device and a camera module capable of reducing the size of the sensor driving device and reducing power consumption.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used below is defined as an optical axis direction of a camera module coupled to an optical device. Meanwhile, the 'optical axis direction' may correspond to a 'vertical direction', a 'z-axis direction', and the like.

Hereinafter, the present invention will be described in more detail with reference to the accompanying drawings.

Figure 1:
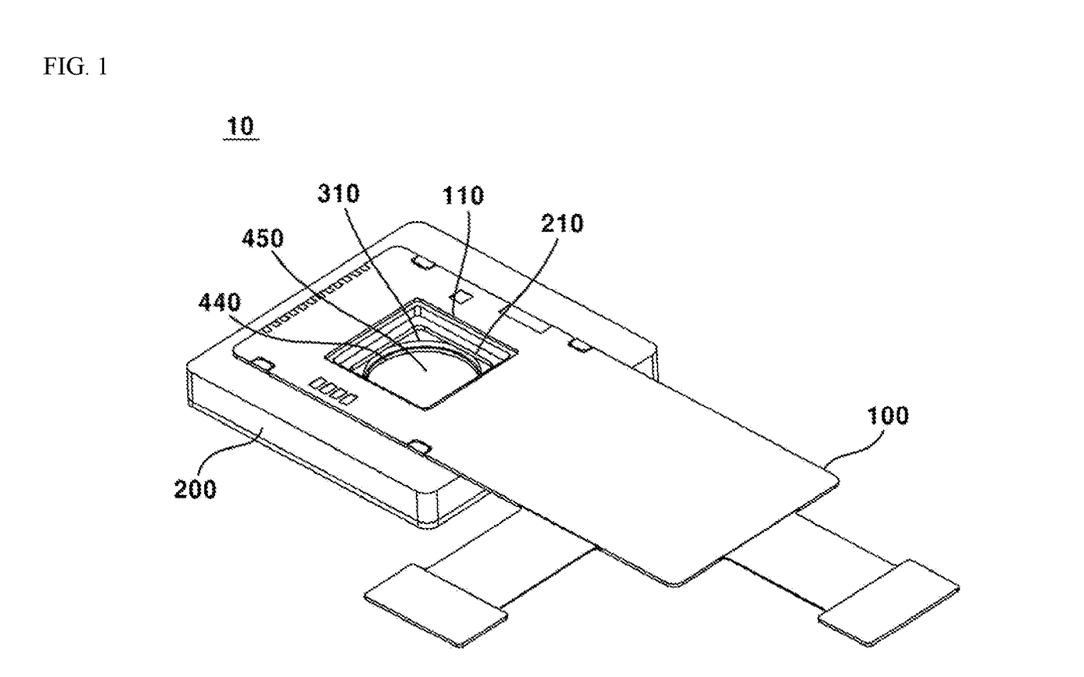
FIG. 1 is a perspective view of a sensor driving device according to an embodiment of the present invention.
Figure 2:
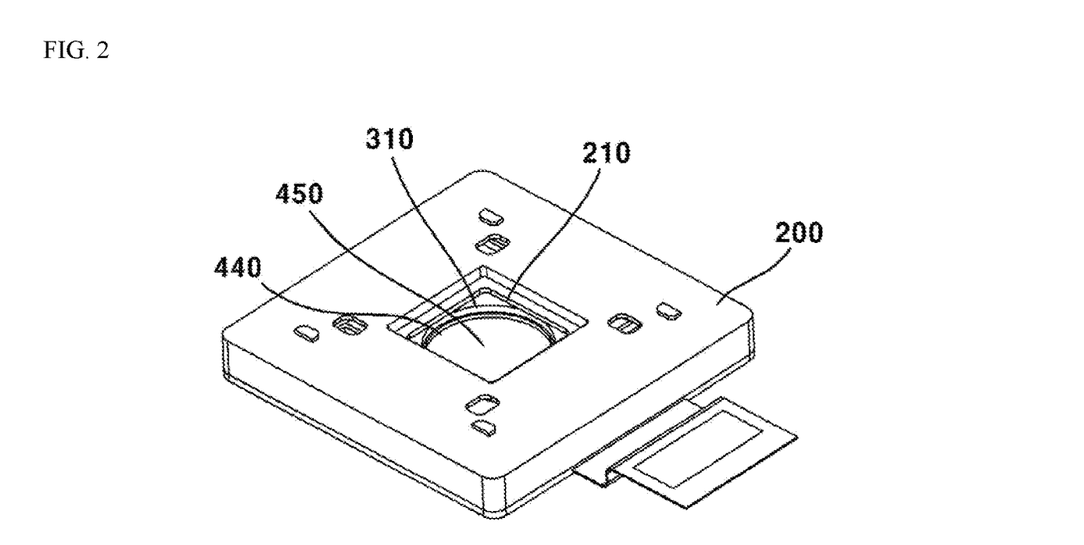
FIG. 2 is a perspective view of a partial configuration of a sensor driving device according to an embodiment of the present invention.
Figure 3:
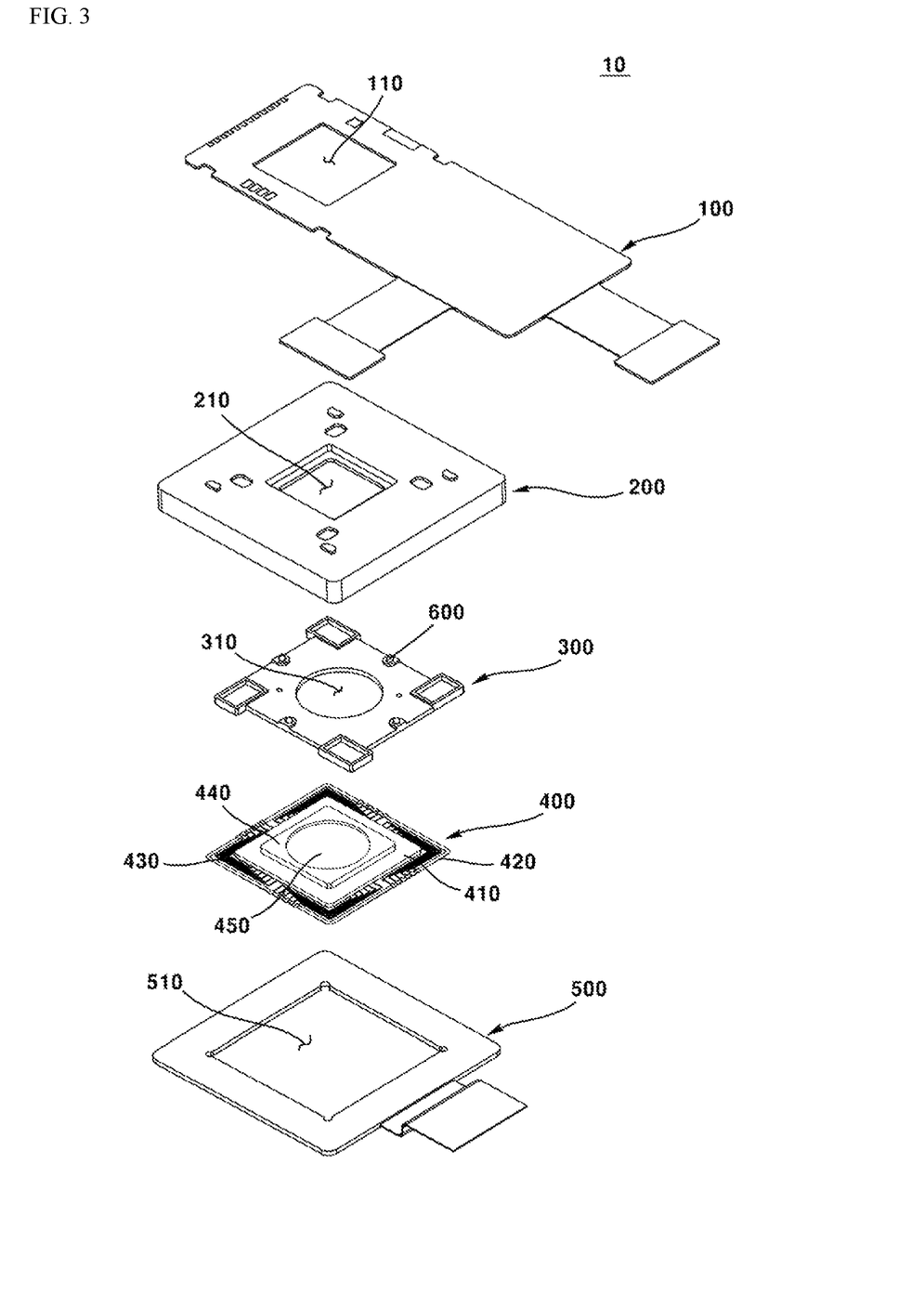
FIG. 3 is an exploded perspective view of a sensor driving device according to an embodiment of the present invention.
Figure 4:
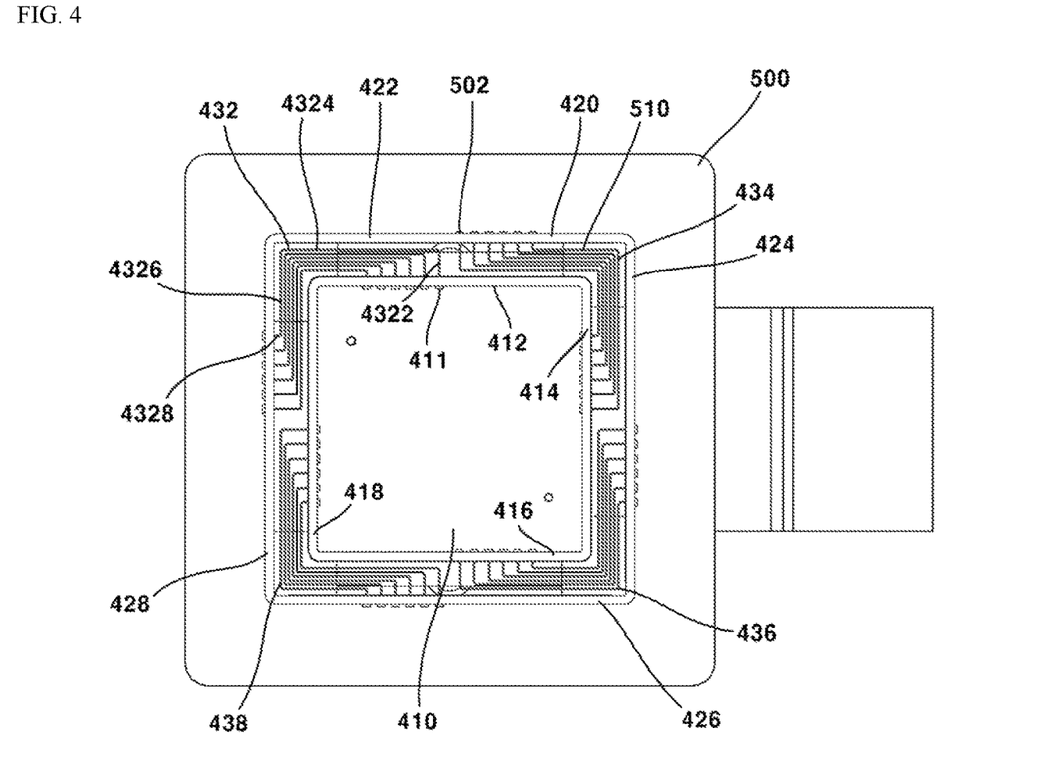
FIG. 4 is a bottom view of a partial configuration of a sensor driving device according to an embodiment of the present invention.
Figure 5:
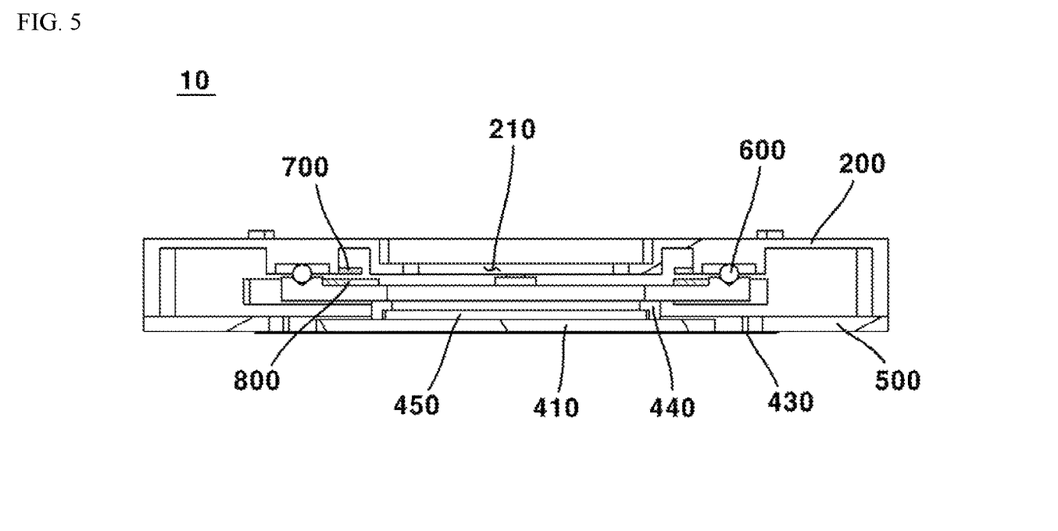
FIGS. 5 to 8 are cross-sectional views of a sensor driving device according to an embodiment of the present invention.
Figure 6:
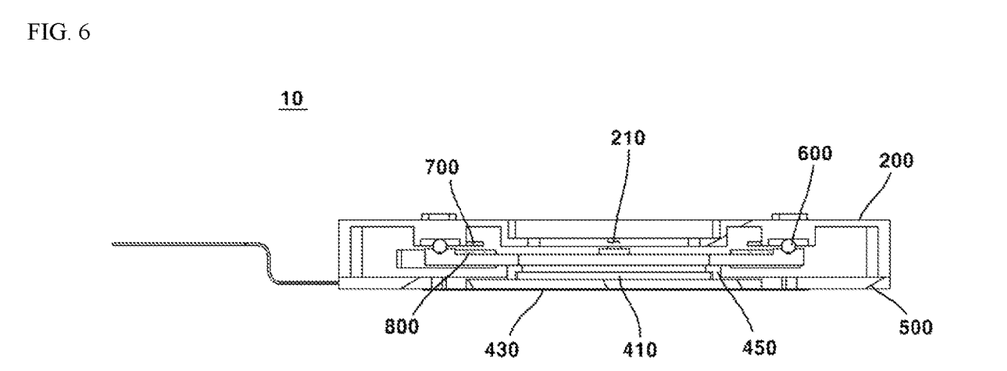
Figure 7:
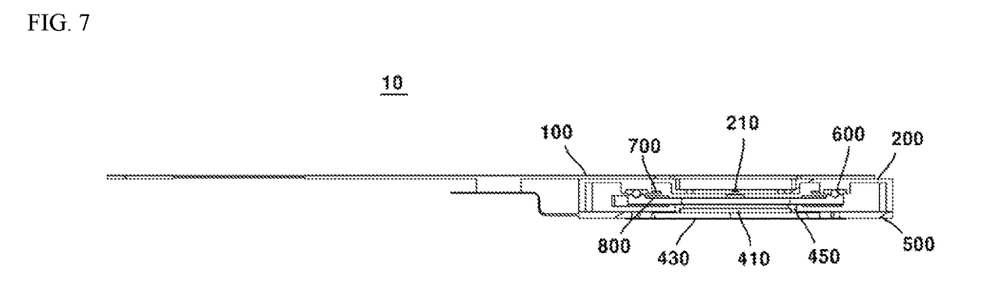
Figure 8:
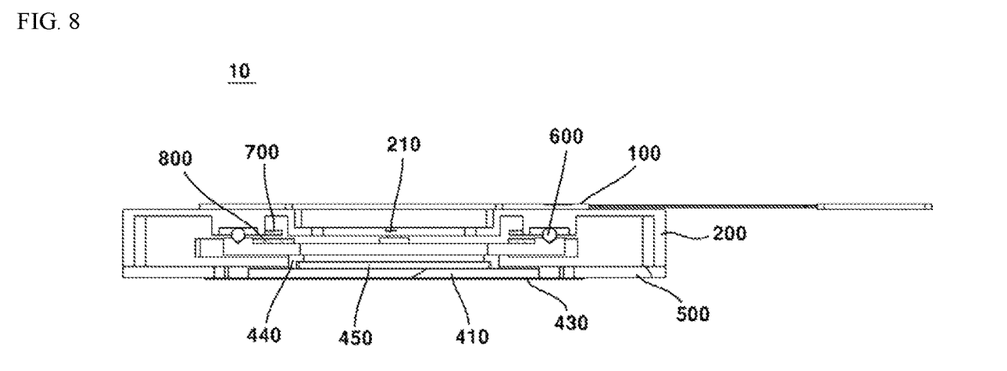
Figure 9:
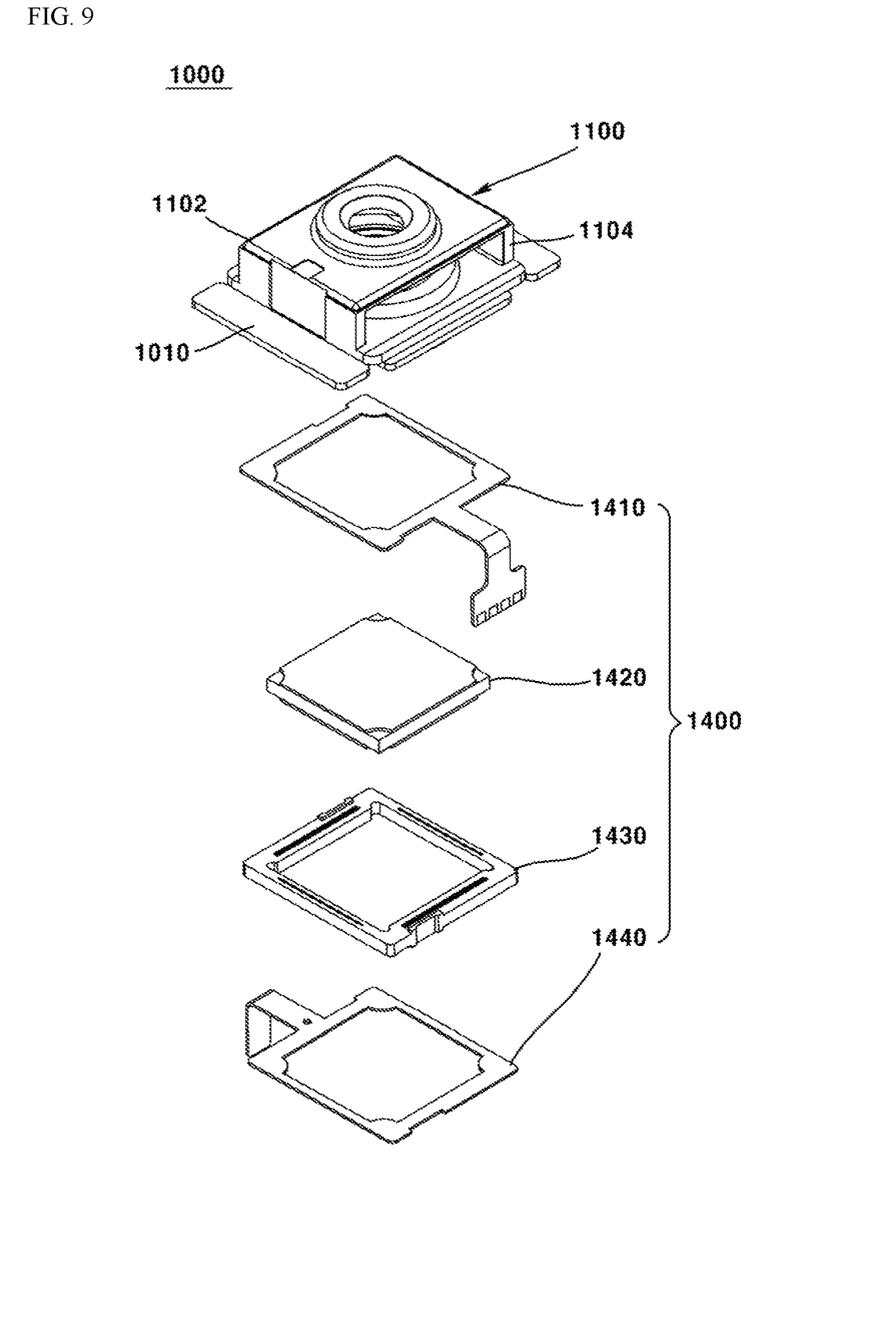
FIG. 9 is a perspective view of a lens module according to an embodiment of the present invention.

FIG. 1 is a perspective view of a sensor driving device according to an embodiment of the present invention. FIG. 2 is a perspective view of a partial configuration of a sensor driving device according to an embodiment of the present invention. FIG. 3 is an exploded perspective view of a sensor driving device according to an embodiment of the present invention. FIG. 4 is a bottom view of a partial configuration of a sensor driving device according to an embodiment of the present invention. FIGS. 5 to 8 are cross-sectional views of a sensor driving device according to an embodiment of the present invention. FIG. 9 is a perspective view of a lens module according to an embodiment of the present invention.

Referring to FIGS. 1 to 9, the camera module according to an embodiment of the present invention comprises a housing 200, a first substrate 500, a support member 410, an image sensor 450, a connector 430, a base 300, a third substrate 100, a guide member 600, a first driving part 700, a second driving part 800, and a lens module 1000, but it may be implemented except for some of the configurations, and does not exclude additional configurations.

The camera module according to an embodiment of the present invention may comprise a sensor driving device 10. The sensor driving device 10 may comprise a housing 200, a first substrate 500, a support member 410, an image sensor 450, a connector 430, a base 300, a third substrate 100, a guide member 600, a first driving part 700, and a second driving part 800, but may be implemented except for some of these configurations, and additional configurations are not excluded.

The camera module according to an embodiment of the present invention may comprise a sensor module 400. The sensor module 400 may comprise a support member 410, a first connection part 420, a connector 430, a second connection part, a coupling part 440, and an image sensor 450, but it may be implemented except for some configurations, and additional configurations are not excluded.

In addition, the camera module according to an embodiment of the present invention may be comprised in an optical device. The optical device may comprise a housing in which at least one of a camera module, a display unit, a communication module, a memory storage unit, and a battery is mounted.

The camera module may comprise a housing 200. The housing 200 may form the outer appearance of the camera module. The housing 200 may have a hexahedral shape with an open lower portion. The third substrate 100 may be disposed in the housing 200. The third substrate 100 may be disposed on an upper portion of the housing 200. A first substrate 500 may be coupled to the housing 200. A first substrate 500 may be disposed below the housing 200. In the space between the housing 200 and the first substrate 500, a support member 410, an image sensor 450, a connector 430, a base 300, a third substrate 100, a guide member 600, a first driving part 700, and a second driving part 800 may be disposed.

The housing 200 may comprise an upper plate and a plurality of side plates being extended from the upper plate. The third substrate 100 may be disposed on an upper surface of the upper plate of the housing 200. The first substrate 500 may be coupled to a lower surface of the side plate of the housing. The upper plate of the housing 200 may comprise a third opening 210. The third opening 210 of the housing 200 may be overlapped with the image sensor 450 in an optical axis direction. A step portion may be formed in a region adjacent to the third opening 210 of the upper plate of the housing 200. A lower portion of the lens module 1000 may be disposed in the stepped portion of the housing 200. A coupling unit may be formed on the upper plate of the housing 200. The coupling unit of the housing 200 may be coupled to the third substrate 100. The coupling unit of the housing 200 may penetrate a groove or hole of the third substrate 100. The coupling unit of the housing 200 may be snap-fit coupled to the third substrate 100.

A guide member 600 may be disposed on the upper plate of the housing 200. A guide member 600 may be disposed on a lower surface of the upper plate of the housing 200. The lower surface of the upper plate of the housing 200 may comprise a first groove in which the guide member 600 is disposed. At least a portion of the guide member 600 may be in contact with the first groove of the housing 200. The cross-section of the first groove of the housing 200 may be formed in a 'U' shape. The first groove of the housing 200 may be in contact with the guide member 600 at one point. The first groove of the housing 200 may face a second groove of the base 300.

The camera module may comprise a first substrate 500. The first substrate 500 may be disposed in the housing 200. The first substrate 500 may be coupled to the housing 200. The first substrate 500 may be coupled to a lower portion of the housing 200. The first substrate 500 may be coupled to a lower surface of the side plate of the housing 200.

The first substrate 500 may be formed in a rectangular plate shape. The first substrate 500 may comprise a first opening 510. A support member 410 may be disposed in the first opening 510 of the first substrate. The connector 430 may be disposed at a position corresponding to the first opening 510. A first connection part 420 may be coupled to a region adjacent to the first opening 510 of the first substrate 500. A first connection part 420 may be fixed to a region adjacent to the first opening 510 of the first substrate 500. A first terminal unit 502 may be formed in a region adjacent to the first opening 510 of the first substrate 500. The first terminal unit 502 of the first substrate 500 may be electrically connected to the connector 430 and/or the first connection part 420, and may be electrically connected to the support member 410. The first terminal unit 502 of the first substrate 500 may comprise a plurality of first terminal units spaced apart from one another.

The first substrate 500 may comprise a first external connection part. The first external connection part may be extended to the outside of the first substrate 500 to receive power from the outside. The first external connection part of the first substrate 500 may be electrically connected to the second external connection part of the third substrate 100. The first external connection part of the first substrate 500 may be electrically connected to the second external connection part of the third substrate 100 from the outside of the housing 200.

The first substrate 500 may comprise a printed circuit board (PCB). The first substrate 500 may comprise a flexible printed circuit board (FPCB). The first external connection part of the first substrate 500 may comprise a flexible printed circuit board (FPCB).

The first substrate 500 may comprise first to fourth inner side surfaces. A space between the first to fourth inner side surfaces of the first substrate 500 may form a first opening 510. The first to fourth inner side surfaces of the first substrate 500 may face the first to fourth side surfaces 412, 414, 416, and 418 of the support member 410, respectively. The first to fourth connection units 422, 424, 426, and 428 of the first connection unit 420 may be disposed on the first to fourth inner side surfaces of the first substrate 500, respectively. The first to fourth connection units 422, 424, 426, and 428 of the first connection part 420 may be disposed on an upper surface of the first substrate 500 adjacent to the first to fourth inner side surfaces of the first substrate 500.

The camera module may comprise a support member 410. The support member 410 may be disposed so as to be able to float on the first substrate 500. The support member 410 may be disposed at a position corresponding to the first opening 510 of the first substrate 500. The support member 410 may be a plate, and may be formed in a square plate shape. The size of the support member 410 may be formed smaller than the size of the first opening 510 of the first substrate 500. The support member 410 may be electrically connected to the first substrate 500 through the connector 430. The support member 410 may be disposed to float on the first substrate 500 through the connector 430. The support member 410 may be elastically supported with respect to the first substrate 500 through the connector 430. The support member 410 may be movably connected to the first substrate 500 through the connector 430.

An image sensor 450 may be disposed in the support member 410. The image sensor 450 disposed in the support member 410 may be overlapped with a second opening 310 of the base 300, the third opening 210 of the housing 200, and the fourth opening 110 of the third substrate 100 in an optical axis direction.

The support member 410 may comprise a second substrate. The support member 410 may comprise a printed circuit board (PCB). The support member 410 may comprise a flexible printed circuit board (FPCB). The support member 410 may be electrically connected to the first substrate 500 through the connector 430 and/or the first connection part 420. The support member 410 may be electrically connected to the image sensor 450.

The support member 410 may be coupled to the base 300. A coupling part 440 may be disposed on the upper surface of the support member 410. The coupling part 440 may be disposed in a region other than the image region of the image sensor 450 among the support member 410. An upper surface of the coupling part 440 may be coupled to a lower surface of the base 300. Through this, the support member 410 may move integrally with the base 300.

The support member 410 may comprise a second terminal unit 411. The second terminal unit 411 of the support member 410 may be electrically connected to the connector 430. The second terminal unit 411 may comprise a plurality of second terminal units spaced apart from one another.

The support member 410 may comprise first to fourth side surfaces 412, 414, 416, and 418. The first to fourth side surfaces 412, 414, 416, and 418 of the support member 410 may correspond to the first to fourth inner side surfaces of the first substrate 500, respectively.

The camera module may comprise an image sensor 450. The image sensor 450 may be disposed in the support member 410. The image sensor 450 may be disposed or mounted on an upper surface of the support member 410. The image sensor 450 may be electrically connected to the support member 410. The image sensor 450 may be overlapped with the second opening 310 of the base 300, the third opening 210 of the housing 200, and the fourth opening 110 of the third substrate 100 in an optical axis direction. The image sensor 450 may perform a function of converting light passing through the lens module 1000 into image data. More specifically, the image sensor 450 may generate image data by converting light into an analog signal through a pixel array comprising a plurality of pixels, and synthesizing a digital signal corresponding to the analog signal.

The camera module may comprise a connector 430. One end of the connector 430 is connected to the first substrate 500 and the other end may be connected to the support member 410. One end of the connector 430 is connected to the first connection part 420 coupled around the first opening 510 of the first substrate 500, and the other end may be connected to the support member 410. The connector 430 may be formed of a material having elasticity. The connector 430 may be bent at least twice. Due to the material of the connector 430 or the shape that is bent at least twice, the support member 410 can be floated against the first substrate 500, and the support member 410 or the image sensor 450 can be moved against the first substrate 500 in a horizontal direction or supported so as to be tilted. Due to the material of the connector 430 or the shape bent at least twice, the support member 410 or the image sensor 450 may be elastically supported against the first substrate 500.

The connector 430 may comprise an electrically conductive material. The connector 430 may be electrically connected to the first substrate 500. The connector 430 may be electrically connected to the support member 410. The connector 430 may electrically connect the support member 410 and the first substrate 500.

The connector 430 may comprise a plurality of connectors 432, 434, 436, and 438. The plurality of connectors 432, 434, 436, and 438 may comprise a first connector 432, a second connector 434, a third connector 436, and a fourth connector 438.

The first connector 432 may be connected to the first side surface 412 of the support member 410 and the fourth inner side surface of the first substrate 500. Unlike this, the first connector 432 may be connected with: the fourth connection unit 428 disposed adjacent to the fourth inner side surface of the first substrate 500; and the first side surface 412 of the support member 410. In addition, the first connector 432 may be connected with: a fourth connection unit 428 disposed adjacent to the fourth inner side surface of the first substrate 500; and a fifth connection unit of the second connection part disposed adjacent to the first side surface 412 of the support member 410.

The first connector 432 may comprise: a first region 4322 connected to the first side surface 412 of the support member 410; a second region 4324 being bent vertically from the first region 4322; a third region 4326 being bent vertically from the second region 4324; and a fourth region 4328 being bent vertically from the third region 4326 and being connected with the fourth inner side surface of the first substrate 500 or the fourth connection unit 428 of the first connection part 420.

The first connector 432 is overlapped with the second connector 434 in a first direction perpendicular to the optical axis direction, and may not be overlapped with the third and fourth connectors 436 and 438 in a first direction. In addition, the first connector 432 is overlapped with the fourth connector 438 in an optical axis direction and a second direction perpendicular to the first direction, and may not be overlapped with the second and third connectors 434 and 436 in a second direction.

The second connector 434 may be connected to a second side surface 414 of the support member 410 and a first inner side surface of the first substrate 500. Unlike this, the second connector 434 may be connected to the first connection unit 422 disposed adjacent to the first inner side surface of the first substrate 500 and to the second side surface 414 of the support member 410. In addition, the second connector 434 may be connected with: the first connection unit 422 disposed adjacent to the first inner side surface of the first substrate 500; and the sixth connection unit of the second connection part disposed adjacent to the second side surface 414 of the support member 410. The shape of the second connector 434 may be understood to be the same as the shape of the first connector 432. The second connector 434 may comprise a plurality of second connectors 434 spaced apart from one another.

The third connector 436 may be connected with the third side surface 416 of the support member 410 and the second inner side surface of the first substrate 500. Unlike this, the third connector 436 may be connected with: the second connection unit 424 disposed adjacent to the second inner side surface of the first substrate 500; and the third side surface 416 of the support member 410. In addition, the third connector 436 may be connected with: the second connection unit 424 disposed adjacent to the second inner side surface of the first substrate 500; and the seventh connection unit of the second connection part disposed adjacent to the third side surface 416 of the support member 410. The shape of the third connector 436 may be understood to be the same as the shape of the first connector 432. The third connector 436 may comprise a plurality of third connectors 436 spaced apart from one another.

The fourth connector 438 may be connected with a fourth side surface 418 of the support member 410 and a third inner side surface of the first substrate 500.

Unlike this, fourth connector 438 may be connected with: the third connection unit 426 disposed adjacent to the third inner side surface of the first substrate 500; and the fourth side surface 418 of the support member 410. In addition, the fourth connector 438 may be connected with: the third connection unit 426 disposed adjacent to the third inner side surface of the first substrate 500; and the seventh connection unit of the second connection part disposed adjacent to the fourth side surface 418 of the support member 410. The shape of the fourth connector 438 may be understood to be the same as the shape of the first connector 432. The fourth connector 438 may comprise a plurality of fourth connectors 438 spaced apart from one another.

Here, the first connection part 420 may comprise first to fourth connection units 422, 424, 426, and 428, and the first connection part 420 may have a rectangular shape comprising an opening. Referring to FIG. 4, the first connection part 420 may be disposed on a lower surface of the first substrate 500. In addition, the first connection part 420 may be disposed adjacent to the first opening 510 of the first substrate 500. The first connection part 420 may be disposed adjacent to the first to fourth inner side surfaces of the first substrate 500.

In addition, the second connection unit may comprise fifth to eighth connection units, and the second connection unit may have a rectangular shape comprising an opening. Referring to FIG. 4, the second connection part may be disposed on a lower surface of the support member 410. In addition, the second connection unit may be disposed adjacent to the first to fourth side surfaces 412, 414, 416, and 418 of the support member 410.

Due to the shape and arrangement of the connector 430 according to an embodiment of the present invention, the support member 410 can be stably elastically supported. In addition, due to the detailed bending shape of the connector 430, it is possible to minimize the effect of the stress generated when the support member 410 is moved on the connector 430.

The camera module may comprise a base 300. The base 300 may be disposed in the housing 200. The base 300 may be disposed in an internal space formed by the housing 200 and the first substrate 500. The base 300 may be coupled to the support member 410. The base 300 may be disposed in the support member 410. The base 300 may be coupled to an upper surface of the support member 410. The base 300 may be in contact with and/or coupled to an upper surface of the coupling part 440 disposed on an upper surface of the support member 410. The housing 200 may be disposed in the base 300, and an upper surface of the base 300 may face a lower surface of the upper plate of the housing 200. A second driving part 800 may be disposed in the base 300. A second driving part 800 may be disposed on an upper surface of the base 300. A guide member 600 may be disposed in the base 300. The base 300 may comprise a second groove in which the guide member 600 is seated. On an upper surface of the base 300, a second groove in which at least a portion of the guide member 600 is in contact with may be comprised. The cross section of the second groove of the base 300 may be formed in a V shape. The second groove of the base 300 may be in contact with the guide member 600 at two points. The second groove of the base 300 may face the first groove of the housing 200.

The camera module may comprise a guide member 600. The guide member 600 may be disposed between the housing 200 and the base 300. The guide member 600 may be disposed between an inner side surface of the housing 200 and a upper surface of the base 300. The guide member 600 may be disposed between an inner side surface of the upper plate of the housing 200 and an upper surface of the base 300.

An upper portion of the guide member 600 may be in contact with an inner side surface of the upper plate of the housing 200, and a lower portion may be in contact with an upper surface of the base 300. At least a portion of the guide member 600 may be seated in a first groove of the housing 200. At least a portion of the guide member 600 may be seated in a second groove of the base 300. The guide member 600 may have a shape of a guide ball. An upper portion of the guide member 600 may be in contact with a first groove of the housing 200 at one point. A lower portion of the guide member 600 may in contact with a second groove of the base 300 at two points. Through this, when the base 300, the support member 410, and the image sensor 450 are tilted through electromagnetic interaction between the first driving part 700 and the second driving part 800, the guide member 600 may guide the movement of the base 300, the support member 410, and the image sensor 450 against the housing 200.

The guide member 600 may comprise a plurality of guide members spaced apart from one another. Each of the plurality of guide members may be formed in a shape corresponding to a position symmetrical with respect to the second opening 310 of the base 300. Each of the plurality of guide members may be disposed adjacent to a central region of each side surface of the base 300.

The camera module may comprise a first driving part 700. The first driving part 700 may be disposed in the housing 200. The first driving part 700 may be disposed on a lower surface of the upper plate of the housing 200. The first driving part 700 may face the second driving part 800. The first driving part 700 may be a coil. In this case, the first driving part 700 may be electrically connected to the third substrate 100 to receive current. Unlike this, first driving part 700 may be a magnet. The first driving part 700 may move the base 300 through electromagnetic interaction with the second driving part 800. The first driving part 700 may comprise a plurality of first driving parts.

The camera module may comprise a second driving part 800. The second driving part 800 may be disposed in the base 300. The second driving part 800 may be disposed on an upper surface of the base 300. The second driving part 800 may face the first driving part 700. When the first driving part 700 is a coil, the second driving part 800 may be a magnet. When the first driving part 700 is a magnet, the second driving part 800 may be a coil. In this case, the second driving part 800 may be electrically connected to the second substrate through the base 300 to receive current. The second driving part 800 may move the base 300 through electromagnetic interaction with the first driving part 700. The second driving part 800 may comprise a plurality of second driving parts. Each of the plurality of second driving parts may face the first driving part 700.

The camera module may comprise a third substrate 100. The third substrate 100 may be disposed in the housing 200. The third substrate 100 may be disposed between the housing 200 and the lens module 1000. It may be disposed on an upper surface of the housing 200 of the third substrate 100. The third substrate 100 may be coupled to an upper surface of the upper plate of the housing 200. The third substrate 100 may be coupled to and fixed to a coupling unit formed on the upper surface of the upper plate of the housing 200. The third substrate 100 may be electrically connected to the lens module 1000. The third substrate 100 may be electrically connected to the first driving part 700. The third substrate 100 may comprise a fourth opening 110. The fourth opening 110 of the third substrate 100 may be overlapped with the image sensor 450 in an optical axis direction.

The third substrate 100 may comprise a second external connection part. The second external connection part of the third substrate 100 may be extended to the outside of the third substrate 100 to receive power from the outside. The second external connection part of the third substrate 100 may be electrically connected to the first external connection part of the first substrate 500. The second external connection part of the third substrate 100 may be electrically connected to the first external connection part of the first substrate 500 at the outside of the housing 200.

The third substrate 100 may comprise a printed circuit board (PCB). The third substrate 100 may comprise a flexible printed circuit board (FPCB). The second external connection part of the third substrate 100 may comprise a flexible printed circuit board (FPCB).

In an embodiment of the present invention, only the third substrate 100 is connected to an external power source, and the third substrate 100 is illustrated as an example in which power is connected to the first substrate 500 through the first and second external connection parts, but is not limited thereto, and only the first substrate 500 may be connected to an external power supply, and both the first substrate 500 and the third substrate 100 may be connected to an external power supply.

The camera module may comprise a lens module 1000. The lens module 1000 may be disposed in the third substrate 100. The lens module 1000 may be disposed on an upper surface of the third substrate 100. The lens module 1000 may receive current from the third substrate 100. The lens module 1000 may be a liquid lens module. The lens module 1000 may be overlapped with the third opening 210 of the third substrate 100 in an optical axis direction. As shown in FIG. 9, the lens module 1000 may comprise: a protrusion 1010, a lens holder 1100, a first lens unit 1200, a second lens unit 1300, and a liquid lens unit 1400.

The protrusion 1010 may be formed to be protruded outward from an outer surface of the lens holder 1100. The protrusion 1010 may be formed in a rectangular plate shape. The protrusion 1010 may be coupled to an upper surface of the third substrate 100. The protrusion 1010 may be coupled to a region adjacent to the third opening 210 among an upper surface of the third substrate 100.

The lens module 1000 may comprise a lens holder 1100. The lens holder 1100 may be coupled to an upper surface of the third substrate 100. The lens holder 1100 may comprise: a first side surface 1102 having a first opening; and a second side surface 1104 having a second opening facing the first opening in a direction perpendicular to the optical axis direction. The lens holder 1100 may comprise a through hole in which the upper portion and the lower portion is open, and the first lens unit 1200, the liquid lens unit 1400, and the second lens unit 1300 may be disposed in the through hole formed inside the lens holder 1100. The first lens unit 1200 and the second lens unit 1300 may be solid lens units. The first lens unit 1200 is coupled to an upper hole formed in an upper portion of the lens holder 1100; and the second lens unit 1300 may be coupled to a lower hole formed in a lower portion of the lens holder 1100. The liquid lens unit 1400 may be disposed and coupled to the first and/or second openings positioned between an upper hole and a lower hole, or disposed and coupled between a first opening and a second opening. The light incident from the outside of the camera module to the first lens unit 1200 may pass through the liquid lens unit 1400 and incident to the second lens unit 1300.

The lens module 1000 may comprise a first lens unit 1200 and a second lens unit 1300. The first lens unit 1200 may be disposed in an upper hole of the lens holder 1100. The second lens unit 1300 may be disposed in a lower hole of the lens holder 1100. The first lens unit 1200 and the second lens unit 1300 may comprise at least one lens.

An exposure lens (not shown) may be provided in front of the first lens unit 1200, and a cover glass may be disposed in front of the exposure lens. Since the exposure lens is protruded toward the outside of the lens holder 1100, the surface may be damaged by being exposed to the outside. When the surface of the lens is damaged, the image quality of the image photographed by the camera module may be deteriorated.

Therefore, in order to prevent and suppress damage to the surface of the exposure lens, to place a cover glass, to form a coating layer, or to prevent damage to the surface of the exposure lens, a method of constructing an exposure lens with a wear-resistant material that is more rigid than the lenses constituting the first lens unit 1200 or the second lens unit 1300, and the like, may be applied.

The lens module 1000 may comprise a liquid lens unit 1400. The liquid lens unit 1400 may be disposed in the lens holder 1100. The liquid lens unit 1400 may be inserted or disposed in a first opening or a second opening formed on sidewalls 1102 and 1104 of the lens holder 1100. The liquid lens unit 1400 may comprise an individual electrode connection substrate 1410, a liquid lens 1420, a spacer 1430, and a common electrode connection substrate 1440.

The individual electrode connection substrate 1410 may electrically connect the individual electrodes of the liquid lens unit 1400 to the third substrate 100. The individual electrode connection substrate 1410 may be implemented as an FPCB. The liquid lens 1420 may comprise a plurality of plates formed to accommodate two different liquids.

The spacer 1430 may be coupled to be surrounding the liquid lens 1420 and may protect the liquid lens 1420 from external impact. In addition, the spacer 1430 may be in contact with a gripper during insertion into the lens holder 1100 or an active aligning process.

The common electrode connection substrate 1440 may electrically connect the common electrode of the liquid lens unit 1400 to the third substrate 100. The common electrode connection substrate 1440 may be implemented as a flexible circuit board (FPCB) or a single metal substrate (conductive metal plate), and may be implemented as a metal substrate comprising an insulating layer in at least some regions except a pad exposed at a position corresponding to the common electrode of the liquid lens 1420 and a pad exposed at a position corresponding to the common electrode pad of the third substrate 100.

The common electrode connection substrate 1440 and the individual electrode connection substrate 1410 may be bent toward the third substrate 100, respectively. The individual electrode connection substrate 1410 may be electrically connected to an electrode pad formed on the third substrate 100 through connection pads electrically connected to each of the individual electrodes. The connection pad and the electrode pad may be electrically connected to each other by conductive epoxy or soldering, but are not limited thereto.

Similarly, the common electrode connection substrate 1440 may be electrically connected to an electrode pad formed on the third substrate 100 through a connection pad electrically connected to the common electrode.

Here, the electrode pads connected to the common electrode connection substrate 1440 and the individual electrode connection substrate 1410 may be defined as a first pad member and a second pad member, respectively, and the first pad member and the second pad member may be disposed in a direction away from the element disposed on the third substrate 100 in the center of the liquid lens.

The interface between the conductive liquid and the non-conductive liquid is deformed by the driving voltage applied through the common electrode connection substrate 1440 and the individual electrode connection substrate 1410 so that the curvature and/or focal length of the liquid lens unit 1400 can be changed. When the deformation of the interface and the change in curvature are controlled, the liquid lens unit 1400 and the camera module and optical device comprising the same can perform an auto-focusing (AF) function, handshake correction or optical image stabilization (OIS) functions, and the like.

Figure 10:
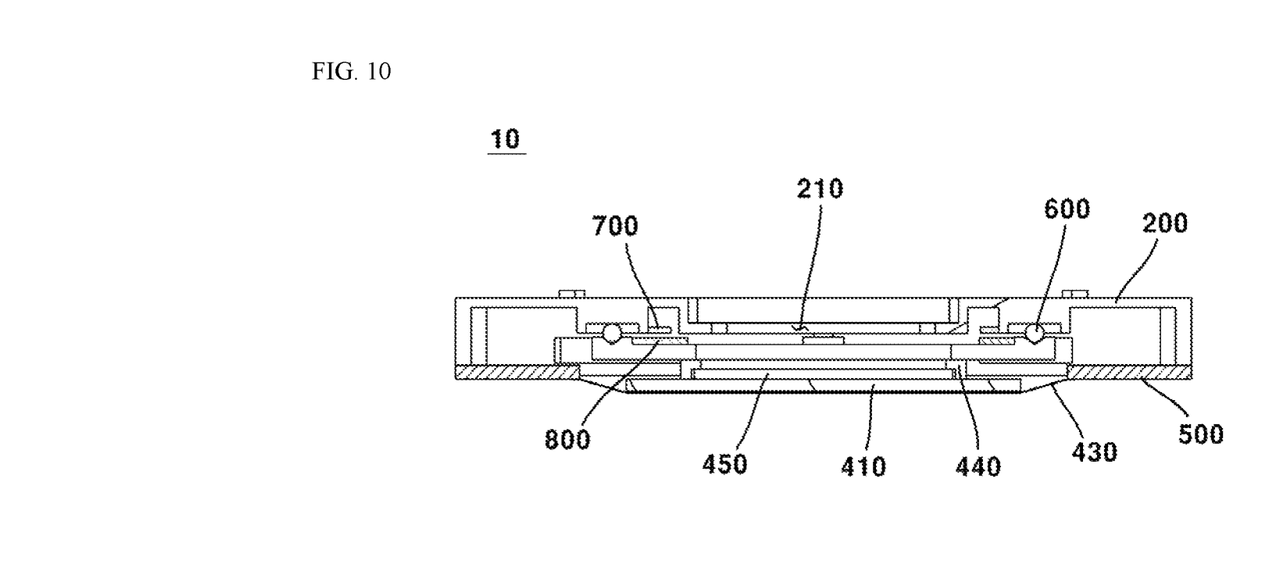
FIG. 10 is a cross-sectional view of a sensor driving device according to another embodiment of the present invention.

FIG. 10 is a cross-sectional view of a sensor driving device according to another embodiment of the present invention.

Referring to FIG. 10, the camera module according to another embodiment of the present invention may comprise a housing 200, a first substrate 500, a support member 410, an image sensor 450, a connector 430, a base 300, a third substrate 100, a guide member 600, a first driving part 700, a second driving part 800, and a lens module 1000, but may be implemented except for some of these the configuration, and does not exclude additional configurations.

A camera module according to another embodiment of the present invention may comprise a sensor driving device 10. The sensor driving device 10 may comprise a housing 200, a first substrate 500, a support member 410, an image sensor 450, a connector 430, a base 300, a third substrate 100, a guide member 600, a first driving part 700, and a second driving part 800 may be comprised, but may be implemented except for some of these configurations, and additional configurations are not excluded.

Hereinafter, a configuration of a camera module according to another embodiment of the present invention that is not described may be understood to be the same as that of the camera module according to an embodiment of the present invention.

Referring to FIG. 10, the first substrate 500 of the camera module according to another embodiment of the present invention may be disposed above the support member 410. The first substrate 500 may be disposed above the support member 410 in an optical axis direction. A lower surface of the first substrate 500 may be disposed above a lower surface of the support member 410. Since the first substrate 500, which is a fixed part, is disposed above the support member 410, which is a moving part, the base 300 connected to the support member 410 may be pressed against the inner side surface of the housing 200 by the elasticity of the connector 430. That is, even when electromagnetic interaction between the first driving part 700 and the second driving part 800 does not occur, the initial position of the image sensor 450 mounted on the support member 410 can be determined, and when the electromagnetic interaction between the first driving part 700 and the second driving part 800 does not occur, unintentional tilting of the image sensor 450 mounted on the support member 410 may be prevented.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A sensor driving device comprising:
a first substrate comprising a first opening;
a housing disposed on the first substrate;
a support member disposed at a position corresponding to the first opening;
an image sensor disposed on the support member;
a connector electrically connecting the first substrate and the image sensor and elastically supporting the support member;
a base disposed on the support member;
a first driving part disposed on the housing; and
a second driving part disposed on the base and facing the first driving part,
wherein the image sensor is configured to move in a direction perpendicular to an optical axis direction by an interaction between the first driving part and the second driving part,
wherein the support member comprises first to fourth side surfaces,
wherein the first substrate further comprises first to fourth inner side surfaces facing the first to fourth side surfaces, respectively, and
wherein one end of the connector is connected to the first side surface, and another end of the connector is connected to the fourth inner side surface.

2. The sensor driving device of claim 1, wherein the connector is bent at least twice.

3. The sensor driving device of claim 1, wherein the connector comprises a first region connected to the first side surface, a second region bent vertically from the first region, a third region bent vertically from the second region, and a fourth region bent vertically from the third region and connected to the fourth inner side surface.

4. The sensor driving device of claim 1, wherein the connector comprises a plurality of connectors spaced apart from each other.

5. The sensor driving device of claim 4, wherein the plurality of connectors comprises a first connector connected to the first side surface and the fourth inner side surface, a second connector connected to the second side surface and the first inner side surface, a third connector connected to the third side surface and the second inner side surface, and a fourth connector connected to the fourth side surface and the first inner side surface.

6. The sensor driving device of claim 5, wherein the first connector is overlapped with the second connector in a first direction, and is not overlapped with the third and fourth connectors in the first direction.

7. The sensor driving device of claim 6, wherein the first connector is overlapped with the fourth connector in a second direction perpendicular to the first direction, and is not overlapped with the second and third connectors in the second direction.

8. The sensor driving device of claim 5, wherein the first connector comprises a plurality of first connectors spaced apart from each other.

9. The sensor driving device of claim 1, further comprising a guide member disposed between an upper surface of the base and an inner side surface of the housing.

10. The sensor driving device of claim 9, wherein the guide member comprises a guide ball.

11. The sensor driving device of claim 10, wherein a groove is formed on at least one of an upper surface of the base and an inner side surface of the housing, and
wherein at least a portion of the guide member is disposed in the groove.

12. The sensor driving device of claim 1, wherein the support member is formed as a second substrate, and
wherein the second substrate is electrically connected to the first substrate by the connector.

13. The sensor driving device of claim 12, wherein the first driving part comprises a magnet,
wherein the second driving part comprises a coil, and
wherein the second substrate is electrically connected to the coil.

14. The sensor driving device of claim 1, further comprising a third substrate fixed to the housing,
wherein the first driving part comprises a coil, wherein the second driving part comprises a magnet, and
wherein the third substrate is electrically connected to the coil.

15. The sensor driving device of claim 14, wherein the base comprises a second opening disposed at a position corresponding to the image sensor in an optical axis direction,
wherein the housing comprises a third opening disposed at a position corresponding to the second opening in the optical axis direction, and
wherein the third substrate comprises a fourth opening disposed at a position corresponding to the third opening in the optical axis direction.

16. The sensor driving device of claim 1, wherein a lower surface of the support member is disposed lower than a lower surface of the first substrate, and
wherein the connector connects the lower surface of the support member and the lower surface of the first substrate.

17. A camera device comprising:
a housing;
a first substrate comprising a first opening and coupled to the housing;
a support member disposed on the first opening;
an image sensor disposed on the support member;
a connector electrically connecting the first substrate and the image sensor, and elastically supporting the support member;
a base disposed on the support member;
a first driving part disposed on the housing;
a second driving part disposed on the base and facing the first driving part;
a lens module disposed on the housing and overlapped with the image sensor in an optical axis direction;
a third substrate disposed on the housing and electrically connected to the lens module, and
wherein the image sensor is configured to move in a direction perpendicular to an optical axis direction by an interaction between the first driving part and the second driving part, and
wherein the lens module comprises a liquid lens.

18. The camera device of claim 17, wherein the connector is bent at least twice.

* * * * *